June 18, 1957  R. P. SEDLOCK  2,795,857
RING GAUGE PROTECTIVE DEVICE
Filed May 19, 1954  2 Sheets-Sheet 1
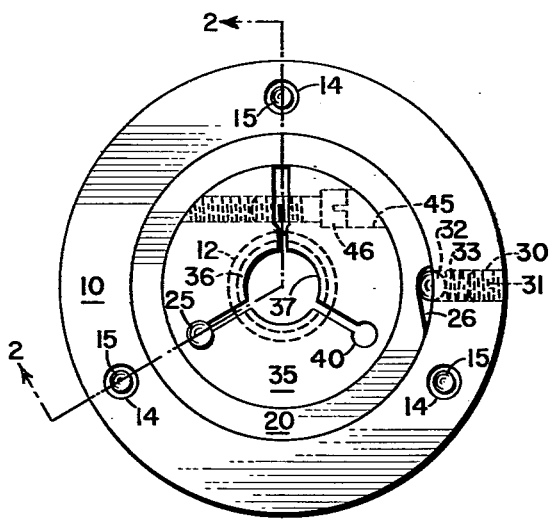
Fig. 1
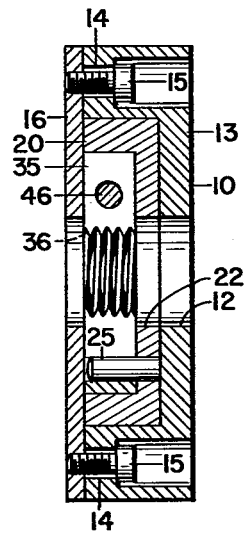
Fig. 2
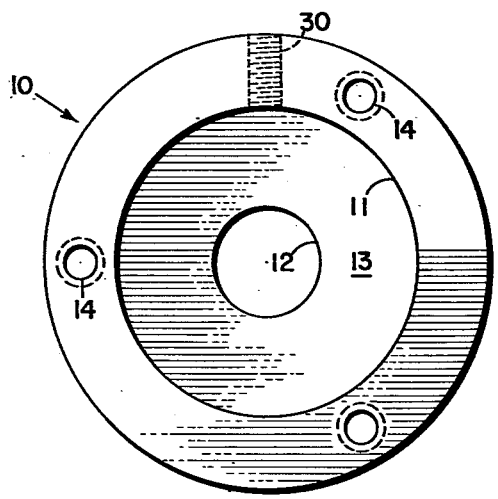
Fig. 4
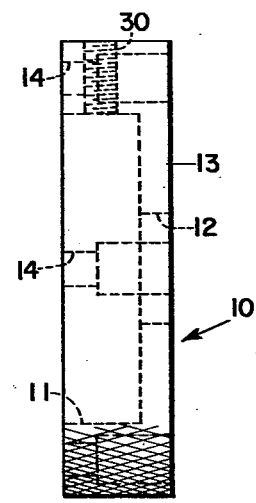
Fig. 3
INVENTOR
ROBERT P. SEDLOCK
BY 
ATTORNEY June 18, 1957  R. P. SEDLOCK  2,795,857
RING GAUGE PROTECTIVE DEVICE
Filed May 19, 1954 2 Sheets-Sheet 2
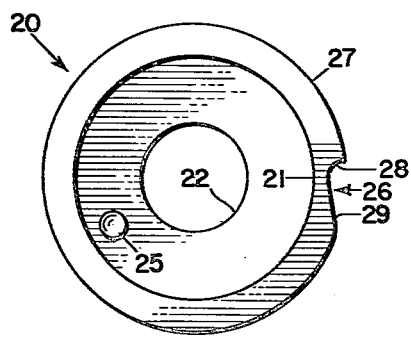
Fig. 6
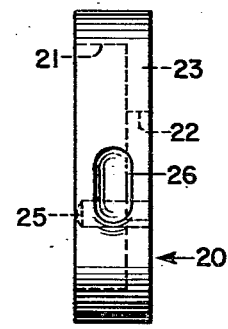
Fig. 5
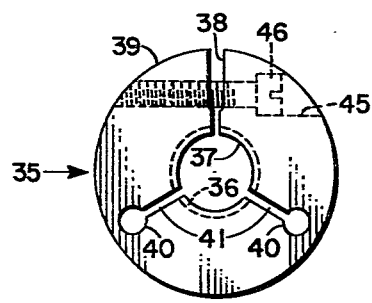
Fig. 8
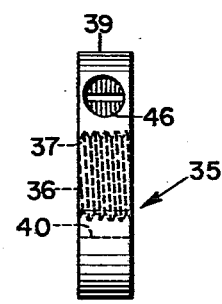
Fig. 7
INVENTOR
ROBERT P. SEDLOCK
BY
ATTORNEY

United States Patent Office 2,795,857
Patented June 18, 1957

2,795,857
RING GAUGE PROTECTIVE DEVICE

Robert P. Sedlock, San Diego, Calif.

Application May 19, 1954, Serial No. 431,013

6 Claims. (Cl. 33—199)

(Granted under Title 35, U. S. Code (1952), sec. 266)

The invention described herein may be manufactured and used by or for the Government of the United States of America for governmental purposes without the payment of any royalties thereon or therefor.

The present invention relates to a ring gauge protective device wherein a detent means is employed to allow relative rotation between a ring gauge and the associated supporting members if an attempt is made to force the gauge on a bolt or screw which is not within a specified tolerance.

The use of ring gauges for testing screw thread members for accuracy of thread lead, pitch diameter, etc. is well known in the art. When such gauges are utilized by inexperienced or careless personnel, the gauges are often forcibly threaded onto bolts or screws which actually have diameters which are too large and not within the tolerance for which the gauge is adjusted. In such instances, the gauge is subjected to excessive wear and the accuracy thereof may be impaired. Prior art gauges have been provided with various means to compensate for such wear, but however, such wear compensating means have not proven to be satisfactory since the symmetry of the gauge and its internal threads is often destroyed and the dimensions of the device altered upon such wear adjustment.

The invention device utilizes an arrangement wherein a ring gauge is rotatably mounted within a supporting structure and a spring pressed detent permits the gauge to to rotate with respect to the supporting structure if the gauge is threaded onto a bolt or screw which is oversize. Upon such relative rotation, the gauge may not be forced any farther onto the bolt or screw and the operator is thereby prevented from causing wear and damage to the gauge. In this manner, the necessity of wear adjustments is eliminated thereby saving time and labor, and the useful life of the gauge is substantially extended.

An object of the present invention is the provision of a new and novel ring gauge protective device which prevents an operator from threading a ring gauge on an oversize bolt or screw.

Another object is to provide a ring gauge protective device which eliminates the necessity of wear adjustment means.

A further object of the invention is the provision of a new and novel ring gauge protective device which is simple and inexpensive in construction, yet sturdy and reliable in operation.

Other objects and many of the attendant advantages of this invention will be readily appreciated as the same becomes better understood by reference to the following detailed description when considered in connection with the accompanying drawings wherein:

Fig. 1 shows a plan view of the assembled device with the cover plate removed for the purpose of illustration, Fig. 2 is a cross-sectional view of the device shown in Fig. 1 taken on the line 2—2 looking in the direction of the arrows, Fig. 3 is an end view of the first body member of the device, Fig. 4 is a plan view of the member shown in Fig. 3, Fig. 5 is an end view of the second body member of the device, Fig. 6 is a plan view of the member shown in Fig. 5, Fig. 7 is an end view of a ring gauge, and Fig. 8 is a plan view of the gauge shown in Fig. 7.

Referring now to the drawings wherein like reference characters designate like or corresponding parts throughout the several views, there is shown in Figs. 1–4 a first cylindrical body member 10 formed of steel or the like having a cylindrical cavity 11 formed therein and a through opening 12 formed in an end wall 13 thereof which communicates with cavity 11. Three equally spaced openings 14 are formed through member 10 and bolts 15 extend through these openings, bolts 15 being threaded through complimentary openings formed in a cover plate 16 whereby the cover plate may be secured in an assembled position relative to member 10 as shown in Fig. 2.

As seen most clearly in Figs. 5 and 6, a second cylindrical body member 20 formed of steel or the like has a cavity 21 formed therein and a through opening 22 is provided in an end wall 23 thereof which communicates with cavity 21. A locking stud 25 is suitably secured to the inner surface of wall 23 and is longitudinally coextensive with member 20. An indentation 26 is formed in the outer periphery 27 of member 20, and as seen in Fig. 6, a first lateral portion 28 of the indentation slopes sharply inward of the outer periphery and the opposite lateral portion 29 slopes gradually inward of the outer periphery thereby providing a one way lock when utilized in conjunction with a ball detent.

As seen in Fig. 1, member 10 is provided with a radial passage 30 having screw threads formed therein, and a set screw 31 is threaded within the outer end thereof. A ball detent 32 is slidably positioned within passage 30 and a compression spring 33 is disposed between the ball detent and the set screw. Ball 32 is shown in position within indentation 26 and, as seen in Fig. 1, it is apparent that member 10 may rotate clockwise with respect to member 20 but is prevented from rotating counterclockwise with respect to member 20 due to the cooperation between ball detent 32 and indentation 26. The amount of force which spring 33 exerts inwardly upon ball 32 may be adjusted by means of set screw 31.

A conventional ring gauge 35 is shown in Figs. 7 and 8 and comprises a generally disk-shaped member formed of steel or the like and having precision ground internal threads 36 formed on the inner periphery of an opening 37 formed therethrough. A stepped slot 38 is formed through member 35 and extends radially from opening 37 to the outer periphery 39 of member 35. Two similar openings 40 are formed longitudinally through the gauge, each of the openings 40 being connected to opening 37 by means of radial slots 41 formed through the gauge. Slots 38 and 41 and openings 40 provide an internal stress in the gauge which tends to cause it to expand. A stepped passage 45 is formed laterally through member 35 and is provided with screw threads on the inner periphery thereof. A bolt 46 is threaded within passage 45 and serves to adjust the size of opening 37 thereby determining the size of thread to be measured by the gauge.

Assembly of the device is as follows: Cover plate 16 is initially detached from member 10, and member 20 is positioned within cavity 11 with ball detent 32 positioned within indentation 26 as shown in Fig. 1. Ring gauge 35 is then inserted within cavity 21 such that stud 25 extends through either one of the openings 40 thereby rotationally fixing member 35 to member 20. Cover plate 16 is then secured to member 10 by means of bolts 15. The compression of spring 33 is adjusted by means of set screw 31 such that a predetermined amount of force must be created between the internal threads 36 of the ring gauge and a bolt or screw which is being tested before member 20 will be allowed to rotate with respect to member 10. In this manner the amount of wear upon threads 36 may be accurately adjusted such that the threads are not forcibly threaded upon an oversized member.

As seen in Fig. 1, it is apparent that a bolt or screw may be inserted within opening 37 thereby engaging the internal threads 36 formed on the inner periphery thereof. Assuming that clockwise rotation of the ring gauge will cause the bolt or screw to be advanced within opening 37, it is apparent that clockwise rotation of member 10 will cause clockwise rotation of member 20 through the intermediary of ball 32 and indentation 26. The tested bolt or screw may be held in one hand and member 10 rotated by the other hand merely by grasping the exterior thereof which be knurled if desired. If the bolt or screw should be too large and not within the tolerance for which the gauge is set, ball 32 will be cammed out of indentation 26 and member 10 will rotate with respect to member 20. In this manner the operator is prevented from exerting excessive clockwise torque on member 35. Upon relative rotation of member 10 with respect to member 20, it is apparent that the tested member is oversized, and the operator may back the ring gauge off of the tested member by rotating member 10 in a counterclockwise direction. When ball 32 is again seated within indentation 26 upon counterclockwise rotation of member 10, the ball will engage lateral portion 28 of the indentation and a positive drive will be created between members 10 and 20 thereby preventing any relative rotation therebetween, and allowing the gauge to be removed from the tested member.

It is also apparent that member 10 may be held stationary within one hand, and the tested bolt or screw may be grasped in the other hand and advanced within opening 37, and that the operation and functioning of the device will be identical, causing relative rotation between members 10 and 20 should the tested member be oversized.

It is evident from the foregoing that there is provided a new and novel ring gauge protective device which prevents an operator from threading a ring gauge on an oversize bolt or screw and which eliminates the necessity of wear adjustment means. The device is simple and inexpensive in construction, yet sturdy and reliable in operation.

Obviously many modifications and variations of the present invention are possible in the light of the above teachings. It is therefore to be understood that within the scope of the appended claims the invention may be practiced otherwise than as specifically described.

I claim:

1. A ring gauge protective device which comprises a first body member having a first cavity formed therein, a second body member rotatably mounted within said first cavity and having a second cavity formed therein, detent means associated with said first and second body members and adapted to allow relative rotation between said body members in one direction and prevent relative rotation therebetween in the opposite direction, and a stud fixed to said second body member and projecting into said second cavity, said stud being adapted to be positioned within a complementary opening formed in a ring gauge means.

2. A ring gauge protective device which comprises a first body member having a first cavity formed therein, a second body member rotatably mounted within said first cavity and having a second cavity formed therein, detent means slidably mounted within said first body member, said second body member having an indentation formed in the outer periphery thereof, means normally urging said detent means inwardly toward the outer periphery of said second body member, and a stud fixed to said second body member and projecting into said second cavity, said stud being adapted to be positioned within a complementary opening formed in a ring gauge means.

3. A device as defined in claim 2 wherein said indentation has a first lateral portion sloping sharply inward of said outer periphery and a second lateral portion sloping gradually inward of said outer periphery, said portions being connected to form a seat for said detent means whereby said body members may rotate relative to one another in one direction and are constrained from relative rotation in the opposite direction.

4. A ring gauge protective device which comprises a first body member having a first cylindrical cavity formed therein, a centrally located aperture formed in an end wall of said first body member and communicating with said first cavity, said first body member having a radially extending passage formed therein communicating with said first cavity, a ball detent slidably positioned within said passage, spring means normally urging said ball radially inward, set screw means for adjusting the force said spring exerts on said ball, a second body member disposed within said first cavity and being rotatable with respect to said first body member, said second body member having an indentation formed in the outer periphery thereof for receiving said ball detent, said second body member having a second cylindrical cavity formed therein, an end wall of said second body member having a centrally located aperture formed therethrough communicating with said second cavity, and a stud fixed to said second body member and projecting into said second cavity, said stud being adapted to be positioned within a complementary opening formed in a ring gauge means.

5. In combination, a first body member having a first cavity formed therein, a second body member rotatably mounted within said first cavity and having a second cavity formed therein, detent means associated with said first and second body members and adapted to allow relative rotation between said body members in one direction and prevent relative rotation therebetween in the opposite direction, a stud fixed to said second body member, and a ring gauge means positioned within said second cavity, said ring gauge means having an opening within which said stud is positioned thereby fixing said ring gauge means for rotation with said second body member.

6. In combination, a first body member having a first cylindrical cavity formed therein, an end wall of said first body member having a centrally located aperture formed therethrough communicating with said first cavity, said first body member having a radially extending passage formed therein communicating with said cavity, a ball detent slidably positioned within said passage, spring means normally urging said ball radially inward, set screw means for adjusting the force said spring exerts on said ball, a second body member disposed within said first cavity and being rotatable with respect to said first body member, said second body member having an indentation formed in the outer periphery thereof for receiving said ball detent, said second body member having a second cylindrical cavity formed therein, an end wall of said second body member having a centrally located aperture formed therethrough communicating with said second cavity, a stud fixed to said second body member, and ring gauge means positioned within said second cavity, said ring gauge having a threaded opening formed centrally therethrough and at least one other opening formed therein, said stud being positioned within said last-mentioned opening.

References Cited in the file of this patent

UNITED STATES PATENTS

| 2,035,082 | Markwick | Mar. 24, 1936 |
| 2,200,885 | Johnson | May 14, 1940 |
| 2,487,987 | Schmitt et al. | Nov. 15, 1949 |

FOREIGN PATENTS

| 530,891 | Great Britain | Dec. 24, 1940 |